United States Patent [19]

Voituriez et al.

[11] 4,212,253
[45] Jul. 15, 1980

[54] SUPPORT DEVICE FOR A BLAST DOWNPIPE OF A BLAST-FURNACE

[75] Inventors: Henry Voituriez, Dunkerque; René Aymard, Grande Synthe, both of France

[73] Assignee: Union Sidérurgique du Nord et de l'Est de la France, Paris, France

[21] Appl. No.: 946,736

[22] Filed: Sep. 29, 1978

[30] Foreign Application Priority Data

Sep. 30, 1977 [FR] France .................... 77 29508

[51] Int. Cl.² ............................... F23L 1/00
[52] U.S. Cl. ..................... 110/182.5; 122/6.6; 266/265
[58] Field of Search ............ 110/182.5; 122/6.6, 122/6.5; 431/154, 155, 186, 343; 266/265, 270; 248/73

[56] References Cited

U.S. PATENT DOCUMENTS

| | | | |
|---|---|---|---|
| 299,536 | 6/1884 | Hartman | 110/182.5 |
| 2,135,252 | 11/1938 | Grover | 110/182.5 |
| 4,027,604 | 6/1977 | Jansson | 110/182.5 |
| 4,027,605 | 6/1977 | Legille | 110/182.5 |

*Primary Examiner*—Edward G. Favors
*Attorney, Agent, or Firm*—Burns, Doane, Swecker & Mathis

[57] ABSTRACT

The device is adapted to avoid the drawbacks of conventional arrangements including tie-rods and tensioners and in particular ensure a correct centering of the nozzle relative to the heel of the tuyere. The device comprises mainly a support fixed to the casing of the blast-furnace which defines slideways in which there is received a plate rigid with the lower cone of the blast downpipe. Means are provided for rendering the cone rigid with its support before disassembly. These means are withdrawn in normal operation.

10 Claims, 4 Drawing Figures

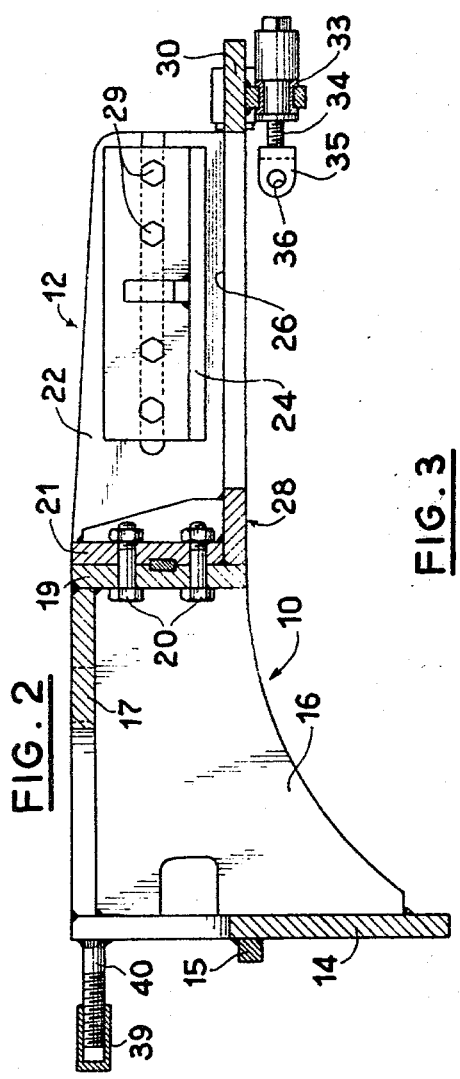
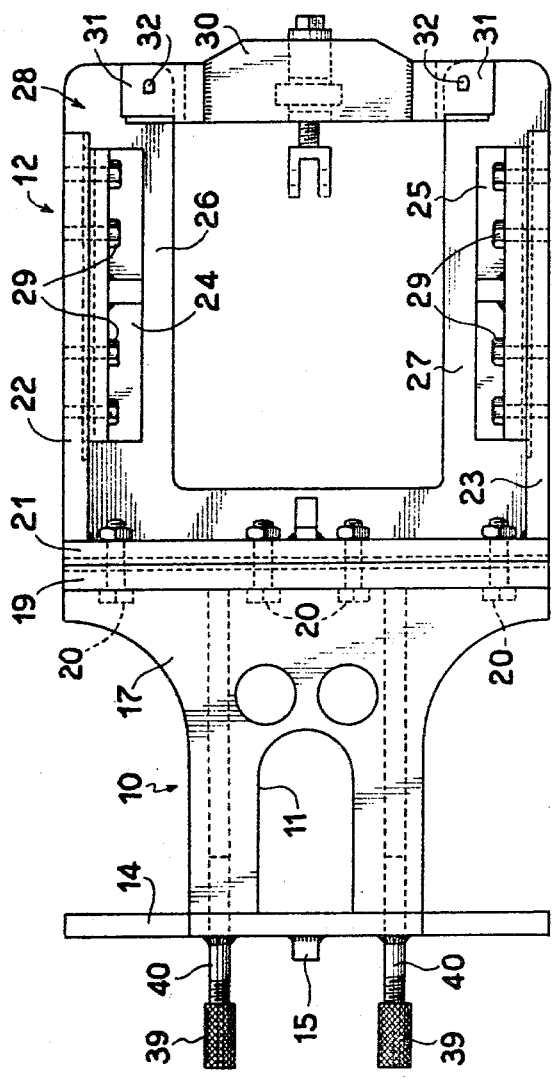
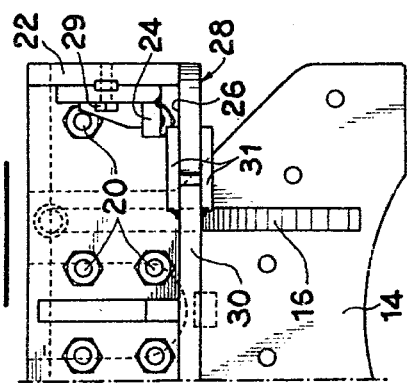

SUPPORT DEVICE FOR A BLAST DOWNPIPE OF A BLAST-FURNACE

The present invention relates to apparatus for supplying hot air or hot blast to blast furnaces.

Such apparatus usually comprise blowers supplying hot air to a bustle pipe surrounding the blast furnace and connected to the tuyeres through a number of pipes termed blast downpipes. These blast downpipes are constructed in a plurality of sections which are fixed to each other by suitable means and some of these elements are suspended from the casing of the blast furnace by tie-rods or tensioning means. Now this arrangement has a certain number of drawbacks. Thus, when the lower element of the blast downpipes must be reassembled after disassembly for repairs or replacing, it is often difficult to position these elements in a precise manner, which is essential to ensure that the lower element termed nozzle, is fitted in the heel of the tuyere. This lack of precision usually results in much loss of time and may be dangerous since the personnel must carry out these operations under difficult conditions.

An object of the invention is to provide a device for supporting or suspending an element or section of a blast downpipe relative to the casing of a blast furnace, which does not have these drawbacks and permits ensuring, under good conditions and with high precision, the assembly and disassembly of the elements or sections located downstream of this element.

According to the invention, there is provided a support unit fixed to the casing of the blast furnace and defining at least one support and guide slideway for a complementary member carried by an element of the blast downpipe.

According to one embodiment, the support unit comprises two pairs of slideways which are parallel to each other and between which said means carried by the element of the blast downpipe is guided, means being provided for blocking said element of the blast downpipe relative to its support when the apparatus has stopped operation and another element of this blast downpipe is disassembled. Preferably, the support is constructed in two parts, a first of which is fixed to the casing, and the second is fixed to the first and defines the slideways, the part fixed to the casing comprising in accordance with another feature of the invention an adjustable abutment adapted to absorb the vertical forces produced in the course of the operation of the apparatus.

The apparatus will be described in more detail hereinafter with reference to the accompanying drawing which is given solely by way of example and in which:

FIG. 2 is a sectional view of the support alone;

FIG. 3 is a plan view of this support, and

FIG. 4 is a partial lateral elevational view of the support.

Figure 1:
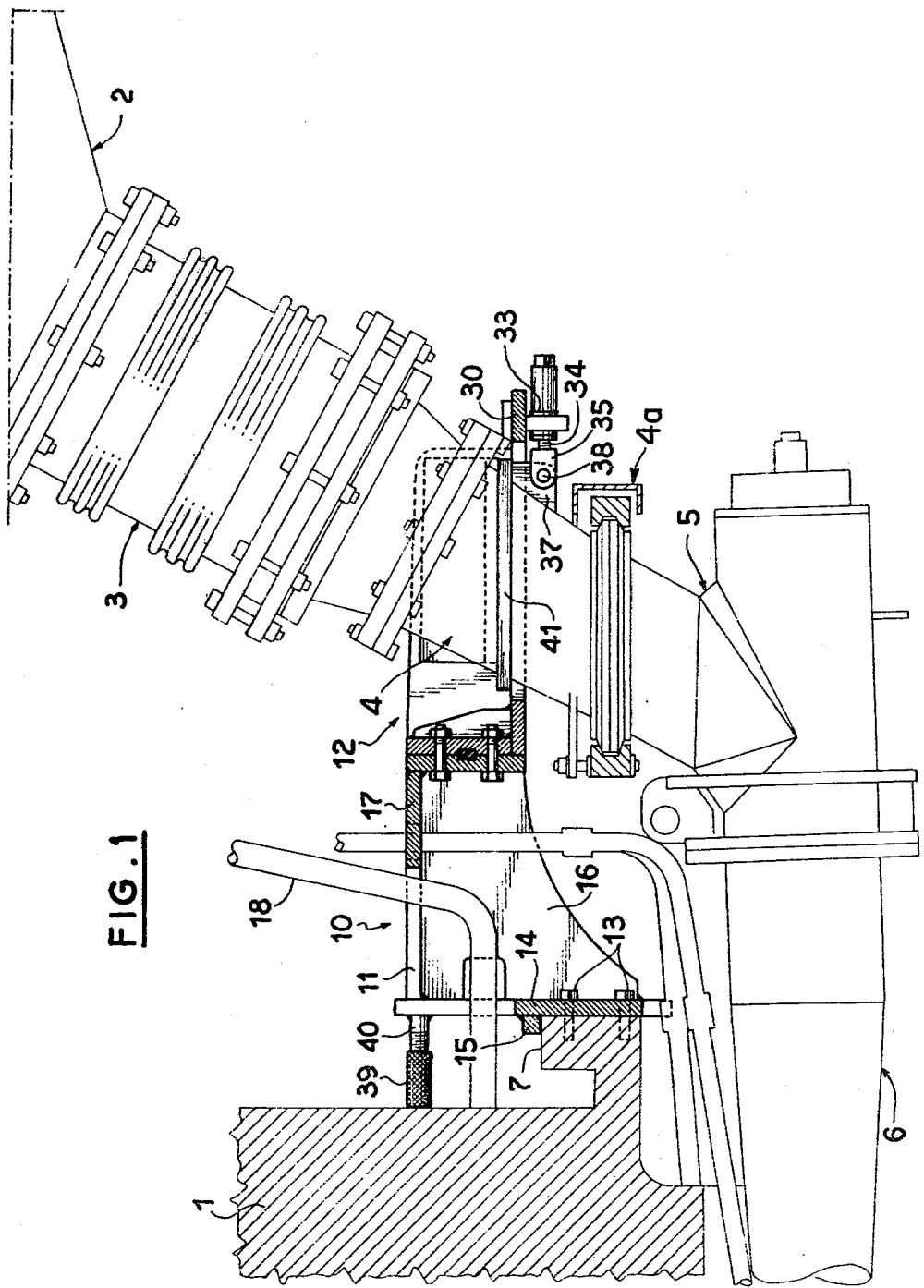
FIG. 1 is a side elevational view and partial vertical sectional view of a part of an apparatus according to the invention.

FIG. 1 shows a part of an apparatus supplying hot air or hot blast to a blast furnace whose casing is designated by the reference number 1. The apparatus comprises a bustle pipe 2 and a blast downpipe 3 in a plurality of elements or sections and in particular a lower conical element 4 on which is detachably fixed, by means of a releasable coupling 4a, an intermediate elbow element 5, or lower mouth, carrying a nozzle 6 adapted to be connected to a tuyere.

According to the invention, a support device 10 here constructed in two main parts 11, 12 maintains and guides the lower conical element 4 of the blast downpipe. The support device comprises a support proper 11 fixed to the casing of the blast furnace, for example by bolts 13. This support comprises mainly a rear wall 14 which is reinforced by at least one bracket 15 bearing against a horizontal surface 7 of the casing, two lateral wings 16, an upper wall 17 which is apertured to allow the passage of conduits or pipes such as 18, and a front wall 19. Fixed on the latter by bolts 20 is the subassembly 12 which has in plan a U-shape (FIG. 3) and comprises vertical walls 21, 22, 23, the wall 21 of which allows the fixing on the front face 19 of the support and the two other walls 22, 23 of which are lateral and support upper slideway members 24, 25. The lower members of these slideways are formed by the upper horizontal surfaces 26, 27 of a lower wall 28 of the subassembly 12, welded to the vertical walls 21, 22, 23. This horizontal wall or plate has a U-shape to allow the passage of the cone 4. The upper members 24, 25 of the slideways have an L-section and are fixed by means of bolts 29 to the vertical wings of the subassembly 12. The device is completed by a cross-member 30 which is guided by two U-shaped ends 31 on the two wings of the plate 28 and fixed to the latter by two pins 32 or other suitable means. The cross-member 30 carries in the lower part thereof a simple mechanism for locking the lower cone in position. This mechanism comprises a nut 33 which is prevented from moving in translation but is freely rotatable, and a screw 34 which is movable in translation and terminates in a fork member 35 whose two opposed branches are provided with coaxial apertures 36. This fork member can come into engagement with a bracket 37 which is carried by the lower cone 4 and provided with an aperture (not shown in the drawing). The fork member 35 and the bracket 37 may be rendered rigid with each other by means of a pin 38 which is engaged in the apertures 36.

At least one adjustable abutment 39 constituted by a knurled cap screwed on a screwthreaded rod 40, is provided in the rear part of the support 11. This abutment is adapted to transfer to the casing the vertical upwardly directed forces produced in operation under the effect of variations of temperature. Welded to the cone 4, or fixed thereto by any other means, is a member or plate 41 adapted to be received between the slideway members 24, 26 and 25, 27 respectively.

The assembly just described operates in the following manner:

When it is desired to disassemble the lower part of the blast downpipe, namely the nozzle 6 and the elbow element 5, the fork member 35 is brought into the region of the bracket 37 carried by the lower cone 4 and the latter is locked relative to the support by means of the pin 38. The lower cone is then positioned both vertically by the slideways 24, 25, 26, 27 and horizontally by the locking mechanism 35, 37, 38. The lower part 5, 6 of the blast downpipe can then be disassembled by releasing the coupling 42.

When subsequently reassembling, it is ensured that the joint plane between the lower cone 4 and the elbow element 5 is perfectly determined owing to the assembly of the cone 4 in the slideways, in contrast to what occurred before when this cone is supported by tie-rods which cannot prevent a swinging movement of this member, particularly when it cools. As this joint plane is perfectly defined, the nozzle is adapted in a precise manner and with no particular adjustment in the heel of the tuyere. In operation, the fork member 35 is disengaged from the bracket 37 so as to allow movements of the blast downpipe when expansions and deformations are produced under the effect of the rise in temperature.

Likewise, the adjustable abutment means 39, 40, provided in accordance with a feature of the invention, are important since they permit achieving a precise and effective support of the upper part of the support against the casing and enable the vertical forces which may be produced in use by the high temperatures to which the blast downpipe and its support are subjected to be resisted without damage.

Having now described our invention what we claim as new and desire to secure by Letters Patent is:

1. A device for supporting a lower end element of a blast downpipe of a blast furnace, which end element is superjacent to an elbow element which carries the nozzle of a tuyere, for maintaining said end element in a fixed position when removing the elbow element from said end element for maintenance, the device comprising a support unit for fixing to a rigid casing of the blast furnace and defining at least one supporting and guiding slideway means, a member fixed on said end element and slidably supported on said slideway means, and means for maintaining the position of said member on said slideway means when removing said elbow element from said end element.

2. A device as claimed in claim 1, wherein said supporting and guiding slideway means comprise pairs of slideway members which are parallel to each other and between which slideway members said member fixed to said end element of the blast downpipe is guided.

3. A device as claimed in claim 1, wherein the support unit has the general shape of a U defining two wings between which wings said end element of the blast downpipe is capable of passing, the slideway means being defined along the two wings of said U-shape.

4. A device as claimed in claim 3, wherein the slideway means comprise lower surfaces directly defined by the support unit and members which are combined with and fixed to said support unit define upper surfaces of the slideway means.

5. A device as claimed in any one of the claims 1 to 4, further comprising a detachable cross member fixed to an end of the support unit which is remote from the casing of the blast furnace.

6. A device as claimed in claim 1, wherein said member maintaining means comprise locking means for locking said end element of the blast downpipe relative to the support unit when the blast furnace has stopped operating and said elbow element is removed.

7. A device as claimed in claim 6, wherein said locking means comprise a withdrawable hooking means and a complementary member carried by said end element of the blast downpipe, the hooking means being capable of engaging the complementary member.

8. A device as claimed in any one of the claims 1 to 4, wherein the support unit comprises two parts, one of which parts is for fixing to the casing of the blast furnace and the other part is fixed to said one part and defines the slideway means.

9. A device as claimed in any one of the claims 1 to 4, wherein the support unit comprises an adjustable abutment adapted to bear against said case and absorb vertical forces produced in the course of the operation of the blast furnace.

10. A device as claimed in any one of the claims 1 to 4, wherein the support unit comprises at least one bracket for bearing against a horizontal face of the casing of the blast furnace.

* * * * *